(12) United States Patent
Le Coq

(10) Patent No.: US 8,601,789 B2
(45) Date of Patent: Dec. 10, 2013

(54) HYDRAULIC CONTROL SYSTEM FOR A THRUST REVERSAL DEVICE

(71) Applicant: Aircelle, Gonfreville L'Orcher (FR)

(72) Inventor: Vincent Pierre Le Coq, L A Riviere Saint Sauveur (FR)

(73) Assignee: Aircelle, Gonfreville L'Orcher (FR)

( * ) Notice: Subject to any disclaimer, the term of this patent is extended or adjusted under 35 U.S.C. 154(b) by 0 days.

(21) Appl. No.: 13/656,956

(22) Filed: Oct. 22, 2012

(65) Prior Publication Data

US 2013/0061572 A1 Mar. 14, 2013

Related U.S. Application Data

(63) Continuation of application No. PCT/FR2011/050595, filed on Mar. 22, 2011.

(30) Foreign Application Priority Data

Apr. 20, 2010 (FR) ...................................... 10 52991

(51) Int. Cl.
  *F02K 3/02* (2006.01)
(52) U.S. Cl.
  USPC ......................................... 60/226.2; 60/226.1
(58) Field of Classification Search
  USPC .................. 60/226.1, 226.2, 226.3, 228, 771; 244/110 B; 239/265.37, 265.39, 239/265.29, 265.25; 91/41, 44, 45
  See application file for complete search history.

(56) References Cited

U.S. PATENT DOCUMENTS

| | | | | |
|---|---|---|---|---|
| 3,024,771 A | * | 3/1962 | Criffield et al. | .................... 91/43 |
| 3,086,360 A | * | 4/1963 | Gavin | .............................. 60/229 |
| 3,456,881 A | * | 7/1969 | Beitler et al. | ............ 239/265.19 |
| 4,297,844 A | * | 11/1981 | Halin et al. | ................... 60/226.2 |
| 4,383,647 A | * | 5/1983 | Woodruff et al. | ........ 239/265.19 |
| 4,505,108 A | * | 3/1985 | Woodruff et al. | .............. 60/327 |

FOREIGN PATENT DOCUMENTS

| | | |
|---|---|---|
| FR | 2902839 | 12/2007 |
| FR | 2922058 | 4/2009 |
| FR | 2922059 | 4/2009 |
| GB | 1200800 | 8/1970 |
| GB | 2446441 | 8/2008 |

OTHER PUBLICATIONS

PCT/FR2011/050595 International Search Report.

* cited by examiner

*Primary Examiner* — Phutthiwat Wongwian
*Assistant Examiner* — Vikansha Dwivedi
(74) *Attorney, Agent, or Firm* — Brinks Gilson & Lione

(57) ABSTRACT

A control system of a hydraulic type for a thrust reversal device with which a jet engine nacelle is equipped, and associated with a nozzle variation device, is provided by the present disclosure. The control system includes at least one additional control unit hydraulically connecting actuators together, wherein hydraulic supply lines from the control unit in a nozzle mode and from the control unit in a reverser mode are then able to communicate hydraulically with each other. A plurality of control valves are laid out so that when the unit for driving the actuators in a nozzle mode is active, a corresponding hydraulic signal controls the valves of the control unit in a position such that the hydraulic supply lines of the actuators from the driving unit according to a reverser mode are cut off.

11 Claims, 1 Drawing Sheet

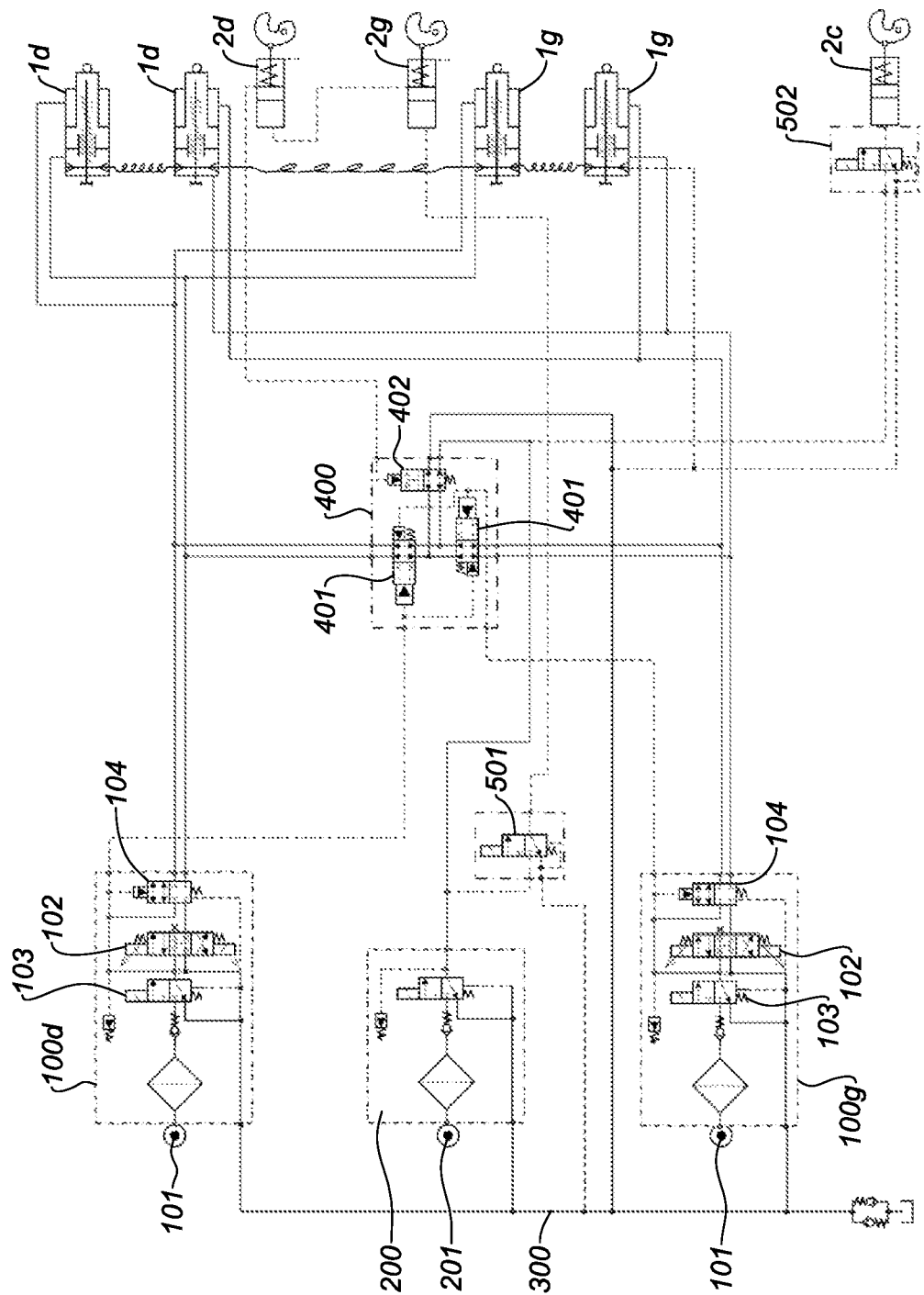

HYDRAULIC CONTROL SYSTEM FOR A THRUST REVERSAL DEVICE

CROSS-REFERENCE TO RELATED APPLICATIONS

This application is a continuation of International Application No. PCT/FR2011/050595 filed on Mar. 22, 2011, which claims the benefit of FR 10/52991, filed on Apr. 20, 2010. The disclosures of the above applications are incorporated herein by reference.

FIELD

The present invention relates to a control architecture for a thrust reversal device with which a jet engine nacelle is equipped, and associated with a nozzle variation device.

BACKGROUND

The statements in this section merely provide background information related to the present disclosure and may not constitute prior art.

An airplane is driven by several jet engines each housed in a nacelle also harboring an assembly of ancillary actuation devices related to its operation and ensuring various functions when the jet engine is operating or at a standstill.

These ancillary actuation devices notably comprise a thrust reversal mechanical system and a nozzle variation system.

The role of a thrust reverser upon landing of an airplane, is to improve the braking capability of the latter by redirecting towards the front at least one portion of the thrust generated by the jet engine. In this phase, the reverser gives the possibility of sending towards the front of the nacelle all or part of the gas flows ejected by the jet engine, consequently generating a counter-thrust which will be added to the braking of the wheels of the aircraft. To do this, a thrust reverser comprises on either side of the nacelle a mobile cowl which may be displaced from a deployed position which opens in the nacelle a passage intended for the deflected flow during a braking phase on the one hand and a retracted position which closes this passage during normal operation of the jet engine or when the airplane is at a standstill on the other hand.

The mobile cowls may fulfill a deflection function or simply a function for activating other deflection means.

In the case of a reverser with deflection grids, reorientation of the airflow is carried out by deflection grids, associated with reversal flaps which block a portion of the air circulation vein, the cowl only having a simple sliding function aiming at exposing or covering these deflection grids.

Moreover, in addition to its thrust reversal function, the sliding cowl belongs to the rear section and has a downstream side forming the ejection nozzle aiming at channeling the ejection of the air flows.

The optimum cross-section of the ejection nozzle may be adapted depending on the different flight phases, i.e. take-off, ascent, cruising, descent phases.

It should be noted that the operating phases of the variable nozzle and of the thrust reverser are distinct, the variable nozzle can only operate when the reverser is activated upon landing.

According to known devices, the variable nozzle may be made from one or several dedicated mobile elements, such as pivoting flaps or a translatable cowl portion or this function may be fulfilled by the mobile cowl itself by translational movements of small amplitude not activating the thrust reversal function.

For an extensive and detailed description of different embodiments, reference may be made to documents FR 2 922 058, FR 2 902 839, FR 2 922 059, inter alia.

In order to allow the driving of the mobile cowl in its thrust reversal function and the driving of the variable nozzle, it should generally be resorted to dedicated simple effect actuators, or to dual action actuators having a dual rod.

Document GB 2,446,441 describes a control architecture for a jet engine nacelle comprising a thrust reversal device associated with a variable nozzle device. The system described in document GB 2,446,441 uses dual action actuators.

For reasons of size and of mass of the nacelle, it should ideally be possible to use simple action actuators in order to apply both functions.

One of the problems posed by the application of simple action actuators for controlling both devices or functionalities is the observance of aeronautical safety standards and more particularly criteria for control segregation for the thrust reversal device and availability criteria for the variable nozzle device.

For a thrust reversal device with a hydraulic control as they for example exist on the A340, each mobile cowl is associated with, on the one hand, two so-called primary locks installed on the upper and lower actuators, the control of which by a hydraulic action is allowed by joint driving of two valves for closing the hydraulic supply circuit of the actuators, and, on the other hand, with a tertiary lock with an independent electric drive.

For safety reasons, the driving operations of both valves and of the tertiary lock should be performed along perfectly segregated control lines.

SUMMARY

One aspect of the present disclosure is to present an architecture allowing the use of simple action actuators in the actuation of variable nozzle devices and of associated thrust reversal devices while observing aeronautical safety requirements.

To do this, the present disclosure relates to a control system of the hydraulic type for a thrust reversal device with which a jet engine nacelle is equipped, and associated with a nozzle variation device, the thrust reversal device comprising at least one mobile cowl capable of being driven into translation by a plurality of simple action actuators synchronized with each other on the one hand and at least two so called primary locks and at least one so called tertiary lock on the other hand, the plurality of simple action actuators being also capable of driving the variable nozzle device if necessary, said hydraulic control system comprising at least one unit for driving the actuators according to a variable nozzle mode, and at least one unit for driving the actuators according to a thrust reverser mode, characterized in that the control system comprises at least one additional control unit hydraulically connecting the actuators with each other, the hydraulic supply lines from the control unit in a nozzle mode and from the control unit in a reverser mode being able to communicate with each other hydraulically, and comprising a plurality of control valves laid out so that when the unit for driving the actuators in the nozzle mode is active, a corresponding hydraulic signal controls the valves of the control unit in a position such that the hydraulic supply lines of the actuators from the driving unit in a reversal mode are cut off.

Thus, by providing a control unit ensuring segregation between driving in a reverser mode and driving in a nozzle mode, it is possible to use simple action actuators for fulfilling both types of operating modes.

Moreover, the presence of mechanical synchronization between the actuators and the possibility of putting the actuators in fluidic communication with each other increases the availability of the device while observing segregation of the reverser mode.

It will be noted that pneumatic systems are also included, by the expression of hydraulic type.

Advantageously, the system comprises at least two driving units in the nozzle mode capable of each driving at least one actuator, the whole of the valves of the control unit being capable of allowing hydraulic communication between the hydraulic supply lines of the actuators from each nozzle driving unit.

Still advantageously, the putting of the actuators into hydraulic communication, driven by different nozzle driving means is controlled in the case of a failure of a driving unit.

More particularly, it will be noted that the actuators will be advantageously arranged pairwise, each controlled by a driving unit.

Preferentially, the system comprises at least one so-called primary lock, and preferably two so-called primary locks.

Still preferentially, the primary locks are hydraulically driven by the unit for driving the actuators in a reverser mode.

Advantageously, the hydraulic driving of the actuators related to the driving unit in a reverser mode is associated with at least one blocking valve, notably belonging to the control unit, allowing distribution of hydraulic power upon receiving an unlocking signal from at least one primary lock, preferably from two primary locks.

Still advantageously, the control signal is hydraulic and results from the pressurization of so-called primary locks in order to open the latter.

Preferentially, the system comprises at least one so-called tertiary lock.

Advantageously, the driving and/or control units are directly or indirectly controlled by a central unit for monitoring and controlling the jet engine, currently designated under the terms of FADEC or EEC.

Advantageously, at least one portion of the actuators is equipped with at least one position sensor, notably of the RVDT and/or LVDT type.

The present disclosure also relates to a nacelle for a jet engine equipped with a thrust reversal device and an associated variable nozzle device, characterized in that these devices are actuated by a control system according to the invention.

Further areas of applicability will become apparent from the description provided herein. It should be understood that the description and specific examples are intended for purposes of illustration only and are not intended to limit the scope of the present disclosure.

The present disclosure will be better understood in the light of the detailed description which follows with regard to the appended drawing in which the single FIGURE is a schematic illustration of an exemplary embodiment of a control system according to the invention.

DRAWINGS

FIG. 1 is a schematic illustrating a hydraulic control system for a mobile cowl of a thrust reversal device according to the teachings of the present disclosure.

The drawing described herein is for illustration purposes only and is not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 schematically illustrates a hydraulic control system for a mobile cowl of a thrust reversal device also comprising a variable nozzle device (not visible).

To do this, this mobile cowl is capable of being driven in translation by four hydraulic actuators 1.

More specifically, let us consider the case of a single mobile cowl substantially peripheral to the nacelle, the four actuators 1 being arranged pairwise on each side of a longitudinal axis of the nacelle. The right pair of actuators will be noted as 1d and the left pair of actuators as 1g.

Each pair of actuators 1d, 1g is associated with a so-called primary lock 2d, 2g, both locks being also arranged on either side of a longitudinal axis of the nacelle.

A so-called tertiary lock 2c completes the safety system of the thrust reversal device.

According to the present disclosure, the actuators 1d, 1g are simple action actuators only comprising a mobile piston inside a single cylinder.

More specifically, the actuators 1d, 1g are hydraulic actuators with a screw allowing accurate displacements taking into account the relevant application.

The actuation of each actuator 1d, 1g is effected by a hydraulic supply or return circuit which will be detailed subsequently.

The driving of the actuators 1d, 1g is carried out by several driving units, i.e. two driving units 100d, 100g in a variable nozzle mode, and a driving unit 200 in a thrust reversal mode.

Each driving unit 100d, 100g, 200 is connected to a pressurized fluid supply 101, 201 as well as to a pressurized fluid return circuit 300.

The driving units 100d, 100g in a nozzle mode each supply in parallel hydraulic fluid to a pair of actuators 1d, 1g. For safety reasons, the actuators assigned to each driving unit 100d, 100g will be crossed, i.e. the driving unit 100d will supply a right actuator 1d and a left actuator 1g. The same applies for the driving unit 101g.

The driving units 100d, 100g in a nozzle mode are substantially equivalent to the corresponding driving units described in document GB 2,446,441. However it should be noted that document GB 2,446,441 describes one driving unit in a nozzle mode per actuator, and they do not fluidically communicate with each other.

Each driving unit 100d, 100g comprises a three-way directional servo-valve 102, a supply insulation valve 103 with an electric control and a total insulation valve 104.

The servo-valve 102 is used for continuously controlling the pressure in the large chamber of each driven asymmetrical actuator 1d, 1g and for controlling the deployment thereof. It should be noted that the small chamber of the actuators is to be supplied with the pressure of the network 101, when the nozzle variation function is activated, by means of the solenoid valve 103.

The supply insulation valve 103 is used for activating nozzle control and for allowing the fluid to flow from the supply 101 through the control unit 100d, 100g.

The total insulation valve 104 is used for deactivating and totally insulating the control unit 100d, 100g of the circuit.

Each driving unit 100d, 100g in a nozzle mode is controlled by an airplane or jet engine controller currently designated under the acronyms of FADEC (Full Authority Digital Engine Controller) or EEC (Electronic Engine Controller). Each driving unit 100d, 100g will be controlled by one of the two channels of the FADEC simultaneously.

The driving unit 200 in a reverser mode is substantially functionally equivalent to the one described in document GB 2,446,441 and comprises a valve 203 capable of allowing pressure to be applied to the actuators 1d, 1g for operating in a thrust reversal mode.

According to the present disclosure, the system comprises an additional control unit 400 hydraulically connecting the actuators 1d, 1g together and allows the driving unit 200 in the reverser mode to be hydraulically connected to the simple action actuators 1d, 1g.

More specifically, the additional control unit 400 allows activation of the reverser mode by connecting the driving unit 200 to the hydraulic circuit of the actuators 1d, 1g. Complementarily, it also possibly allows draining of a pair of actuators 1d, 1g in the case of deactivation of a driving unit 100 in a nozzle mode and allows all the actuators 1d, 1g to be drained in the case of total deactivation of the two driving units 100 in a nozzle mode.

The control unit is also equipped with valves 401 controlled by the driving units in the nozzle mode 100 according to different modes, i.e.: a short circuit when the system operates in the reverser mode or when a nozzle driving unit 100 is deactivated, and insulation when the system operates in the nozzle mode.

The control unit also comprises a valve 402 involved in the implementation of the functionalities described above and capable of being controlled by a signal for unlocking the primary locks 2d, 2g in order to activate the operation in a thrust reversal mode. Thus, the thrust reverser is only activated after unlocking the locks 2d, 2g.

To do this, the locks 2d, 2g are hydraulically connected to the reverser driving unit 200 and activated via an electrically driven valve 501. After putting the locks 1d, 1g under pressure, a hydraulic signal is sent towards the valve 402 in order to open the reverser hydraulic circuit.

The reverser driving unit 200 also powers the tertiary lock 2c also activated by an electrically driven valve 502.

It will also be noted that each pair of actuators 1d, 1g is equipped with at least one position sensor of the RVDT type or resolver, allowing the position of the variable nozzle to be controlled and at least one LVDT (Linear Variable Differential Transformer) for controlling the thrust reversal function (complete deployment of the actuators).

In a variable nozzle operating mode, the insulation valves 103 are actuated in order to deliver the hydraulic power to the driving unit 100 in charge of redistributing it to the actuators 1d, 1g via the servo-valve 102 adjusting the deployment or retraction of the actuators 1d, 1g.

In the case when a failure of a nozzle driving unit 100 would be detected by the FADEC, the faulty driving unit 100 is deactivated in an insulated mode by the insulation valve 104. The additional control unit 400 is set in a short circuit mode. The hydraulic circuits of both pairs of actuators 1d, 1g communicate and the second driving unit 100 continues to control its actuator pair.

As the actuators are mechanically synchronized by a flexible shaft (commonly designated under the term of «flexshaft», the driven actuators transmit their movement to the faulty actuators.

Although the invention has been described with a particular exemplary embodiment, it is quite obvious that it is by no means limited thereto and that it comprises all the technical equivalents of the means described as well as their combinations if the latter enter the scope of the invention.

What is claimed is:

1. A control system of a hydraulic type for a thrust reversal device with which a jet engine nacelle is equipped, and associated with a nozzle variation device, the thrust reversal device comprising:
   at least one mobile cowl capable of being driven into translation by a plurality of simple action actuators synchronized with each other;
   at least two primary locks; and
   at least one tertiary lock, the plurality of simple action actuators being also capable of driving the nozzle variation device, said control system comprising at least one driving unit for the actuators in a variable nozzle mode, and at least one unit for driving the actuators in a thrust reversal mode,
   wherein the control system comprises at least one additional control unit hydraulically connecting the actuators together, wherein hydraulic supply lines from the control unit in the nozzle mode and from the control unit in the reverser mode are then able to communicate hydraulically with each other, said additional control unit comprising a plurality of control valves laid out so that when the unit for driving the actuators in a nozzle mode is active, a corresponding hydraulic signal controls the valves of the control unit in a position such that the hydraulic supply lines of the actuators from the driving unit according to a reverser mode are cut off.

2. The system according to claim 1, further comprising at least two driving units in a nozzle mode capable of each driving at least one actuator, the whole of the valves of the control unit being capable of allowing hydraulic communication between the hydraulic supply lines of the actuators from each nozzle driving unit.

3. The system according to claim 2, wherein putting of the actuators driven by different nozzle driving units in communication is controlled in the case of a failure of a driving unit.

4. The system according to claim 1, wherein the primary locks are hydraulically driven by the unit for driving the actuators in a reverser mode.

5. The system according to claim 1, wherein the hydraulic driving of the actuators linked to the driving unit in a reverser mode is associated with at least one blocking valve, notably belonging to the control unit, allowing distribution of hydraulic power upon receiving an unlocking signal for the at least two primary locks.

6. The system according to claim 5, wherein the control signal is hydraulic and results from the pressurization of the primary locks in order to open the latter.

7. The system according to claim 1, wherein at least one of the driving and control units are directly or indirectly controlled by a central monitoring and control unit of the jet engine, currently designated under the terms of Full Authority Digital Engine Controller ("FADEC") or Electronic Engine Controller ("EEC").

8. The system according to claim 1, wherein at least one portion of the actuators is equipped with at least one position sensor, notably of the Rotary Variable Differential Transformer ("RVDT") and/or Linear Variable Differential Transformer ("LDVT") type.

9. The system according to claim 1, wherein the control of the variable nozzle cross-section is continuous, for example by means of at least one servo-valve.

10. The system according to claim 9, wherein the servo-valve is of a three-way type and adapted to the regulation of asymmetrical actuators wherein a non-control chamber is fed at constant pressure.

11. A nacelle for a jet engine equipped with a thrust reversal device and an associated variable nozzle device, wherein the thrust reversal device and the variable nozzle devices are actuated by a control system according to claim 1.

* * * * *